United States Patent [19]
Rosenberg et al.

[11] Patent Number: 5,880,714
[45] Date of Patent: *Mar. 9, 1999

[54] THREE-DIMENSIONAL CURSOR CONTROL INTERFACE WITH FORCE FEEDBACK

[75] Inventors: Louis B. Rosenberg, Pleasanton; Bernard G. Jackson, Atherton, both of Calif.

[73] Assignee: Immersion Corporation, San Jose, Calif.

[*] Notice: The term of this patent shall not extend beyond the expiration date of Pat. No. 5,701,140.

[21] Appl. No.: 784,198

[22] Filed: Jan. 15, 1997

Related U.S. Application Data

[63] Continuation of Ser. No. 583,032, Feb. 16, 1996, Pat. No. 5,701,140, which is a continuation of Ser. No. 92,974, filed as PCT/US94/07851 Jul. 12, 1994, abandoned.

[51] Int. Cl.$^6$ .................................................. G09G 5/00
[52] U.S. Cl. ........................... 345/156; 345/157; 345/158
[58] Field of Search .................................. 345/156, 157, 345/158, 162

[56] References Cited

U.S. PATENT DOCUMENTS

| | | | |
|---|---|---|---|
| 2,906,179 | 9/1959 | Bower | 90/13.5 |
| 3,531,868 | 10/1970 | Stevenson | 33/174 |
| 3,890,958 | 6/1975 | Fister et al. | 128/2 S |

(List continued on next page.)

FOREIGN PATENT DOCUMENTS

| | | |
|---|---|---|
| 434610A | 2/1992 | Japan . |
| 2254911 | 10/1992 | United Kingdom . |
| WO9502801 | 1/1995 | WIPO . |
| WO9520787 | 8/1995 | WIPO . |
| WO9520788 | 8/1995 | WIPO . |
| WO9616397 | 5/1996 | WIPO . |
| WO9622591 | 7/1996 | WIPO . |

OTHER PUBLICATIONS

Massimo Andrea Russe, "The Design and Implementation of a Three Degree–of–Freedom Force Output Joystick", Department of Mechanical Engineering, May 11, 1990.

Calvin, McCoy Winey III, "Computer Simulated Visual and Tactile Feedback as an Aid to Manipulator and Vehicle Control", S.B. Massachusetts Institute of Technology, Jun. 1981.

Paul Jerome Kilpatrick, "The Use of a Kinesthetic Supplement in an Interactive Graphics System", Xerox University Microfilms, Ann Arbor, Michigan 48106, © Copyright by Paul Jerome Kilpatrick 1976.

McAffee, Douglas A., "Teleoperator System/Telerobot Demonstrator: Force Reflecting Hand Controller Equipment Manual," JPL Jan. 1988, pp. 3–8, 11, and A–34.

Howe, Robert D., "Task Performance with a Dextrous Teleoperated Hand System," Proceedings of SPIE, Nov. 1992, vol. 1833, pp. 1–9.

(List continued on next page.)

*Primary Examiner*—Matthew Luu
*Attorney, Agent, or Firm*—James R. Riegel

[57] ABSTRACT

A method and apparatus for use with a computer for providing commands to a computer through tracked manual gestures and for providing feedback to the user through forces applied to the interface. A user manipulatable object is coupled to a mechanical linkage which is, in turn, supportable on a fixed surface. The mechanical linkage or the user manipulatable object is tracked by sensors for sensing the location and/or orientation of the object. A multiprocessor system architecture is disclosed wherein a host computer system is interfaced with a dedicated microprocessor which is responsive to the output of the sensors and provides the host computer with information derived from the sensors. The host computer runs an application program which responds to the information provided via the microprocessor and which can provide force-feedback commands back to the microprocessor, the force feedback being felt by a user via the user manipulatable object.

30 Claims, 9 Drawing Sheets

U.S. PATENT DOCUMENTS

| | | | |
|---|---|---|---|
| 3,919,691 | 11/1975 | Noll | 340/172.5 |
| 3,923,166 | 12/1975 | Fletcher et al. | 214/1 |
| 3,944,798 | 3/1976 | Eaton | 3/56 |
| 4,216,467 | 8/1980 | Colston | 340/365 L |
| 4,398,889 | 8/1983 | Lam et al. | 434/45 |
| 4,477,973 | 10/1984 | Davies | 33/1 CC |
| 4,571,834 | 2/1986 | Fraser et al. | 33/1 PT |
| 4,593,470 | 6/1986 | Davies | 33/1 CC |
| 4,632,341 | 12/1986 | Repperger et al. | 244/230 |
| 4,638,798 | 1/1987 | Shelden et al. | 128/303 B |
| 4,653,011 | 3/1987 | Iwano | 364/513 |
| 4,654,648 | 3/1987 | Herrington et al. | 340/710 |
| 4,670,851 | 6/1987 | Murakami et al. | 364/518 |
| 4,676,002 | 6/1987 | Slocum | 33/1 MP |
| 4,679,331 | 7/1987 | Koontz | 33/551 |
| 4,688,983 | 8/1987 | Lindbom | 414/735 |
| 4,703,443 | 10/1987 | Moriyasu | 364/559 |
| 4,750,487 | 6/1988 | Zanetti | 128/303 B |
| 4,769,763 | 9/1988 | Trieb et al. | 364/559 |
| 4,775,289 | 10/1988 | Kazerooni | 414/735 |
| 4,787,051 | 11/1988 | Olson | 364/518 |
| 4,791,934 | 12/1988 | Brunnett | 128/653 |
| 4,800,721 | 1/1989 | Cemenska et al. | 60/393 |
| 4,803,413 | 2/1989 | Kendig et al. | 318/648 |
| 4,811,608 | 3/1989 | Hilton | 73/862.04 |
| 4,819,195 | 4/1989 | Bell et al. | 364/571.05 |
| 4,839,838 | 6/1989 | LaBiche et al. | 364/709.11 |
| 4,849,692 | 7/1989 | Blood | 324/208 |
| 4,879,556 | 11/1989 | Duimel | 341/20 |
| 4,888,877 | 12/1989 | Enderle et al. | 33/559 |
| 4,891,889 | 1/1990 | Tomelleri | 33/503 |
| 4,907,970 | 3/1990 | Meenen, Jr. | 434/45 |
| 4,907,973 | 3/1990 | Hon | 434/262 |
| 4,942,545 | 7/1990 | Sapia | 364/571.01 |
| 4,945,305 | 7/1990 | Blood | 324/207.17 |
| 4,945,501 | 7/1990 | Bell et al. | 364/571.05 |
| 4,961,138 | 10/1990 | Gorniak | 364/200 |
| 4,961,267 | 10/1990 | Herzog | 33/503 |
| 4,962,591 | 10/1990 | Zeller et al. | 33/502 |
| 4,982,504 | 1/1991 | Söderberg et al. | 33/502 |
| 4,983,901 | 1/1991 | Lehmer | 318/685 |
| 5,007,085 | 4/1991 | Greanias et al. | 380/25 |
| 5,007,300 | 4/1991 | Siva | 74/471 XY |
| 5,040,306 | 8/1991 | McMurtry et al. | 33/556 |
| 5,044,956 | 9/1991 | Behensky et al. | 434/45 |
| 5,050,608 | 9/1991 | Watanabe et al. | 128/653 R |
| 5,072,361 | 12/1991 | Davis et al. | 364/167.01 |
| 5,088,046 | 2/1992 | McMurtry | 364/474.03 |
| 5,088,055 | 2/1992 | Oyama | 364/560 |
| 5,095,303 | 3/1992 | Clark et al. | 340/710 |
| 5,103,404 | 4/1992 | McIntosh | 318/568.22 |
| 5,107,080 | 4/1992 | Rosen | 200/6 A |
| 5,116,051 | 5/1992 | Moncrief et al. | 273/448 B |
| 5,128,671 | 7/1992 | Thomas, Jr. | 341/20 |
| 5,131,844 | 7/1992 | Marinaccio et al. | 433/72 |
| 5,132,672 | 7/1992 | Clark | 340/710 |
| 5,139,261 | 8/1992 | Openiano | 273/148 B |
| 5,142,506 | 8/1992 | Edwards | 367/127 |
| 5,142,931 | 9/1992 | Menahem | 74/471 XY |
| 5,143,505 | 9/1992 | Burdea et al. | 414/5 |
| 5,148,377 | 9/1992 | McDonald | 364/560 |
| 5,181,181 | 1/1993 | Glynn | 364/566 |
| 5,182,557 | 1/1993 | Lang | 341/20 |
| 5,184,306 | 2/1993 | Erdman et al. | 364/474.05 |
| 5,184,319 | 2/1993 | Kramer | 364/806 |
| 5,185,561 | 2/1993 | Good et al. | 318/20 |
| 5,187,874 | 2/1993 | Takahashi et al. | 33/502 |
| 5,189,806 | 3/1993 | McMurtry et al. | 33/503 |
| 5,204,824 | 4/1993 | Fujimaki | 364/474.03 |
| 5,209,131 | 5/1993 | Baxter | 73/865.8 |
| 5,216,948 | 6/1993 | Mitchell et al. | 364/474.03 |
| 5,220,260 | 6/1993 | Schuler | 318/561 |
| 5,223,776 | 6/1993 | Radke et al. | 318/568.1 |
| 5,228,356 | 7/1993 | Chuang | 75/471 XY |
| 5,230,623 | 7/1993 | Guthrie et al. | 433/72 |
| 5,243,266 | 9/1993 | Kasagami et al. | 318/568.1 |
| 5,251,127 | 10/1993 | Raab | 364/413.13 |
| 5,251,156 | 10/1993 | Heier et al. | 364/559 |
| 5,259,120 | 11/1993 | Chapman et al. | 33/502 |
| 5,259,894 | 11/1993 | Sampson | 156/64 |
| 5,264,768 | 11/1993 | Gregory et al. | 318/561 |
| 5,275,565 | 1/1994 | Moncrief | 434/29 |
| 5,289,273 | 2/1994 | Lang | 348/121 |
| 5,296,846 | 3/1994 | Ledley | 345/161 |
| 5,351,692 | 10/1994 | Dow et al. | 128/662.06 |
| 5,354,162 | 10/1994 | Burdea et al. | 414/5 |
| 5,379,663 | 1/1995 | Hara | 74/471 XY |
| 5,384,460 | 1/1995 | Tseng | 50/231.14 |
| 5,389,865 | 2/1995 | Jacobus et al. | 318/568.11 |
| 5,396,266 | 3/1995 | Brimhall | 345/161 |
| 5,397,323 | 3/1995 | Taylor et al. | 606/130 |
| 5,402,582 | 4/1995 | Raab | 33/503 |
| 5,405,152 | 4/1995 | Katanics et al. | 273/438 |
| 5,412,880 | 5/1995 | Raab | 33/503 |
| 5,414,337 | 5/1995 | Schuler | 318/561 |
| 5,417,696 | 5/1995 | Kashuba et al. | 606/9.1 |
| 5,428,748 | 6/1995 | Davidson et al. | 395/275 |
| 5,429,140 | 7/1995 | Burdea et al. | 128/774 |
| 5,436,542 | 7/1995 | Petelin et al. | 318/567 |
| 5,445,166 | 8/1995 | Taylor | 128/897 |
| 5,459,382 | 10/1995 | Jacobus et al. | 318/568.11 |
| 5,467,763 | 11/1995 | McMahon et al. | 600/201 |
| 5,512,919 | 4/1996 | Araki | 345/156 |
| 5,513,100 | 4/1996 | Parker et al. | 364/167.07 |
| 5,587,937 | 12/1996 | Massie et al. | 364/578 |
| 5,589,828 | 12/1996 | Armstrong | 341/20 |
| 5,591,924 | 1/1997 | Hilton | 73/862.043 |
| 5,629,594 | 5/1997 | Jacobus et al. | 318/568.11 |
| 5,631,861 | 5/1997 | Kramer | 364/406 |

OTHER PUBLICATIONS

Snow, E. et al., "Compact Force–Reflecting Hand Controller," JPL, Apr. 1991, vol. 15, No. 3, Item No. 153, pp. 1–15a.

Kotoku, Tetsuo, "A Predictive Display with Force Feedback and its Application to Remote Manipulation System with Transmission Time Display," IEEE 1992, Jul. 7–10, 1992, pp. 239–246.

Iwata, Hiroo, "Pen–based Haptic Virtual Environment," Institute of Engineering Mechanics, University of Tsukuba, Japan, pp. 287–292.

Tavkhelidze, D.S., "Kinematic Analysis of Five–Ink Spherical Mechanisms," Mechanism and Machine Theory, 1974, vol. 9, pp. 181–190.

"Cursor Waldo," Designer's Corner—Useful Technology for Your Idea File, Design News, Mar. 7, 1993, p. 63.

"High Performance Model of the Immersion Probe," Immersion Probe—MD™, Immersion Corporation.

"3D Human Interface Tool," Immersion Probe™, Immersion Corporation.

"The Personal Digitizer™," Immersion Corporation.

"Foot–Operated Mouse," IBM Technical Disclosure Bulletin, Apr. 1986, vol. 28, No. 11.

Kenneth Meyer et al., "Survey of Position Trackers," The Massachuetts Institute of Technology Spring 1992, vol. 1, No. 2, pp. 173–200.

Smith, Geoffrey, "Call It Palpable Progress," *Business Week,* Oct. 9, 1995, pp. 93, 96.

Rosenberg, Louis B., *Perceptual Design of A Virtual Rigid Surface Contact*, Center for Design Research, Stanford University, Armstrong Laboratory, AL/CF–TR–1995–0029, Apr. 1993.

Jacobsen, S.C. et al., "High Performance, High Dexterity, Force Reflective Teleoperator II," ANS Topical Meeting on Robotics & Remote Systems, Albuquerque, New Mexico Feb. 24–27, 1991, pp. 1–10.

Kotoku, Tetsuo et al., "Environment Modeling for the Interactive Display (EMID) Used in Telerobotic Systems," IEEE Nov. 3–5, 1991, pp. 99–1004.

Bejczy, Antal K., "The Phantom Robot: Predictive Displays for Teleoperation with Time Delay," IEEE 1990, pp. 546–550.

Buttolo, Pietro et al., "Pen–Based Force Display for Precision Manipulation in Virtual Environments," IEEE Mar. 1995, pp. 1–8.

Tan, Hong Z. et al., "Human Factors for the Design of Force–Reflecting Haptic Interfaces," Tan, Srinivasan, Eberman, & Chang, ASME WAM 1994, pp. 1–11.

Ellis, R.E. et al., "Design and Evalusation of a High–Performance Prototype Planar Haptic Interface," ASME Dec. 3, 1993, DSC–vol. 49, pp. 55–64.

Adelstein Bernard D. et al., "A High Performance Two Degree–of–Freedom Kinesthetic Interface," Massachusetts Institute of Technology 1992, pp. 108–112.

Colgate J. Edward et al., Implementation of Stiff Virtual Walls in Force–Reflecting Interfaces, Sep. 22, 1993.

Iwata, Hiroo et al, Volume Haptization, IEEE 1993, pp. 16–18.

Fischer, Patrick et al., "Specification and Design of Input Devices for Teleoperation," 1990.

Burdea, Grigore et al., "Distributed Virtual Force Feedback," IEEE, May 2, 1993, pp. 25–44.

Rosenberg, Louis B., "The Use of Virtual Fixture as Perceptual Overlays to Enhance Operator Performance in Remote Environments," Air Force Material Command, Sep. 1992, pp. 1–42.

Rosenberg, Louis B., "The Use of Virtual Fixtures to Enhance Operator Performance in Time Delayed Teleoperation", Crew Systems Directorate Biodynamics and Biocommunications Division Wright–Patterson, Air Force Material Command, Mar. 1993, pp. 1–45.

Burdea, Grigore et al., "A Portable Dextrous Master with Force Feedback," *Presence: Teleoperators and Virtual Environments*, MIT Press, Jun. 1991.

Rosenberg, Louis B. et al., "Perceptual Decomposition of Virtual Haptic Surfaces," IEEE, Oct. 1993.

Rosenberg, Louis B., "Virtual Fixtures as Tools to Enhance Operator Performance in Telepresence Environments," SPIE Telemanipulator Technology, 1993.

Rosenberg, Louis B., "Virtual Haptic Overlays Enhance Performance in Telepresence Tasks," SPIE 1994.

Burdea, Grigore et al., "Dextrous Telerobotics with Force Feedback—An Overview," Robotica 1991, vol. 9.

Colgate, J. Edward et al., "Implementation of Stiff Virtual Walls in Force–Reflecting Interfaces," 1993, pp. 1–9.

Yamakita, M. et al., Tele–Virtual Reality of Dynamic Mechanical Model, IEEE Jul. 7–10, 1992, pp. 1103–1110.

Adlestein, Bernard D. et al., "Design and Implementation of a Force Reflecting Manipulation for Manual Control Research," 1992, pp. 1–24.

Ouh–young, Ming et al., "Force Display Performs Better than Visual Display in a Simple 6–D Docking Task," IEEE 1989, pp. 1462–1466.

Kim, Won S. et al., "Graphics Displays for Operator Aid in Telemanipulation," IEEE 1991, pp. 1059–1067.

Hannaford, Blake et al., "Performance Evaluation of a Six–Axis Generalized Force–Reflecting Teleoperator," IEEE May/Jun. 1991, vol. 21, No. 3, pp. 620–633.

Kim, Won S. et al., "A Teleoperation Training Simulator with Visual and Kinesthetic Force Virtual Reality", Human Vision, Visual Proceedings, Proc. SPIE 1666, San Jose, CA, Feb. 1992.

Minsky, Margaret et al., "Feeling and Seeing: Issues in Force Display," ACM 1990, pp. 235–242.

Herndon, J.N. et al., "The State–of–the–Art Model M–2 Maintenance System," Proceedings of the 1984 National Topical Meeting on Robotics and Remote Handling in Hostile Environments, American Nuclear society, pp. 59–65.

Batter, James J. et al., "Grope–1: A Computer Display to the Sense of Feel," pp. TA–4–188–TA–4–192.

Gotow, J.K., et al., "Perception of Mechanical Properties at the Man–Machine Interface," IEEE 1987, pp. 688–689.

"Proceedings of the IFIP Congress 65," International Federation for Information Processing, Information Processing 1965, vol. 3, New York, May 24–29, 1965, p. 506.

Atkinson, William D. et al., "Computing with Feeling," Comput. & Graphics, vol. 2, No. 2–E, pp. 97–103.

Noll, A. Michael, "Man–Machine Tactile Communication Dissertation," Polytechnic Institute of Brooklyn, Jun. 1971, pp. 1–88.

Ouh–Young, Ming, "Force Display in Molecular Docking," Chapel Hill 1990, pp. 1–85.

Ouh–young, Ming et al., "Using a Manipulator for Force Display in Molecular Docking," IEEE 1988, pp. 1824–1829.

Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting 1991, pp. 708–712.

Fisher, S.S. et al., "Virtual Environment Display System," ACM 1986 Workshop on Interactive 3D Graphics Oct. 23–24.

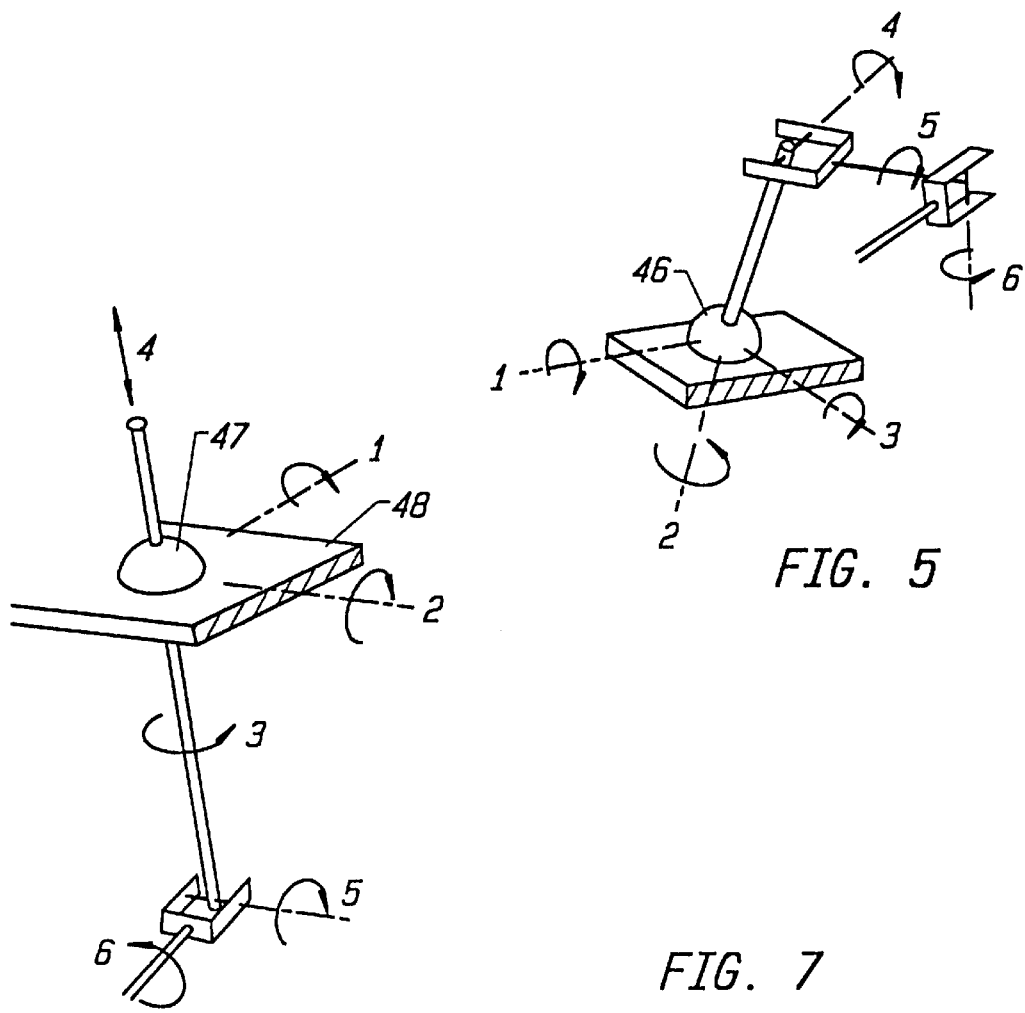
FIG. 5
FIG. 6
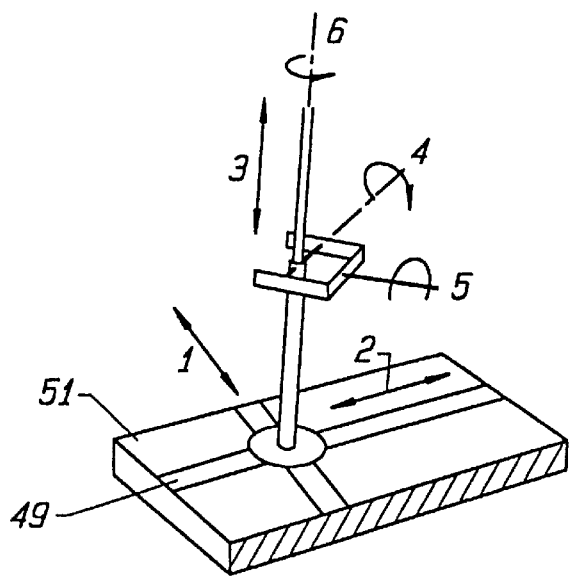
FIG. 7

THREE-DIMENSIONAL CURSOR CONTROL INTERFACE WITH FORCE FEEDBACK

CROSS REFERENCE TO RELATED APPLICATIONS

This is a continuation application of prior application Ser. No. 08/583,032, filed on Feb. 16, 1996, now U.S. Pat. No. 5,701,140, which is the national stage of International Application No. PCT/US94/07851, filed Jul. 12, 1994, and which is a continuation of U.S. application Ser. No. 08/092,974, filed Jul. 16, 1993, now abandoned.

FIELD OF THE INVENTION

The present invention relates to a computer-human interface device, and more particularly it relates to a stylus coupled to a supportable mechanical linkage for providing and receiving commands to and from a computer.

BACKGROUND OF THE INVENTION

As the use of Computer Aided Design (CAD) Systems becomes more widespread, the need for cursor and command control devices which accurately and easily track three-dimensional position or motion is also growing. Devices which allow users to control a cursor with three-dimensional position and/or orientation commands are available for various applications. Among them are many hand-held input devices which allow users to interact with a host processor by controlling the position of a cursor or manipulating graphic objects on a computer screen. While these devices allow three-dimensional information to be transmitted to a computer they do not allow the user to use gestures and motions which are natural to the user.

For example, a prior art device of the type which is used for three-dimensional control involves the use of accelerometers to transduce the position and orientation of a stylus in space as described in U.S. Pat. No. 4,839,838. This device makes no provisions so the stylus can be grasped in a manner which makes use of finger dexterity nor does it include mechanical support to reduce fatigue or enhance user control or dexterity.

Another prior art example is an ultrasonic position-locating device like the one shown in U.S. Pat. No. 5,142,506. This device transduces position and orientation by triangulating ultrasonic signals. As with the prior art previously described, this device uses a free-floating stylus which includes no provisions for mechanical support to reduce fatigue or enhance user control or dexterity. Furthermore, this device is used with a stylus that is grasped in the palm of the hand. The use of such a stylus precludes fine positioning with the fingers and greatly reduces the dexterity of the user to manipulate position and orientation. In addition, this device is used with digital buttons on the stylus to send to the computer command signals. A button of this type is commonly called a "clicker" on a "mouse." Because such buttons are mechanically coupled to the free-floating stylus, it is difficult to push the buttons while maintaining the position and orientation of the stylus. By pushing down on the button, the user will necessarily move the stylus from its desired position. Accordingly, these commands are difficult to control under many circumstances.

SUMMARY OF THE INVENTION

In the present invention, the user holds a stylus which is supported by a support apparatus on a fixed surface so that the user can easily manipulate the stylus in free space to interact with a computer. The three-dimensional motion of the user is translated through the stylus and mechanical linkage to a processor which communicates with the computer, thus allowing commands to be sent to the computer which track the three-dimensional motion of the user. Therefore, cursor control in three-dimensions on the two-dimensional computer screen Is possible.

In one embodiment, the stylus is supportable on a fixed surface by a set of mechanical linkages which include individual components joined together by a sufficient number of joints to allow several degrees of freedom in the motion of the stylus. These mechanical linkages provide mechanical leverage, friction, counter-weighing, and/or spring resistance in order to reduce fatigue of the user and to provide support to enhance the stability and dexterity of user manipulation of the stylus.

In the aforementioned embodiment of the present invention, the joints of the mechanical linkages are coupled to sensors which provide information about their position. Such information is transmitted to a microprocessor so that position and orientation of the stylus can be computed using kinematic equations associated with or related to the particular linkage system. In another embodiment, position and orientation of the stylus is sensed through the use of ultrasonic, magnetic, or optical position and orientation sensors mounted on the stylus.

An embodiment of the present invention includes computer software and hardware which will provide force feedback information from the computer to the stylus. The computer sends feedback signals to the mechanical linkage which has force generators for generating force in response to images depicted on the computer screen. Incoming commands from the host computer are monitored by the microprocessor and instruct the microprocessor to report forces felt by a joint or set forces on a joint of the mechanical linkage.

Another aspect of the present invention includes a remote control unit which is used in place of a command clicker on the stylus. For example, a foot pedal or hand-held unit for the user's opposite hand is included to provide command control to the computer. Accordingly, manual dexterity of stylus manipulation is not compromised.

DESCRIPTION OF THE DRAWINGS

FIG. 5 is a perspective representation of another embodiment of the present invention;

FIG. 6 is a perspective view of still another embodiment of the present invention;

FIG. 7 is a perspective representation of another embodiment;

DESCRIPTION OF PREFERRED EMBODIMENTS

Figure 1:
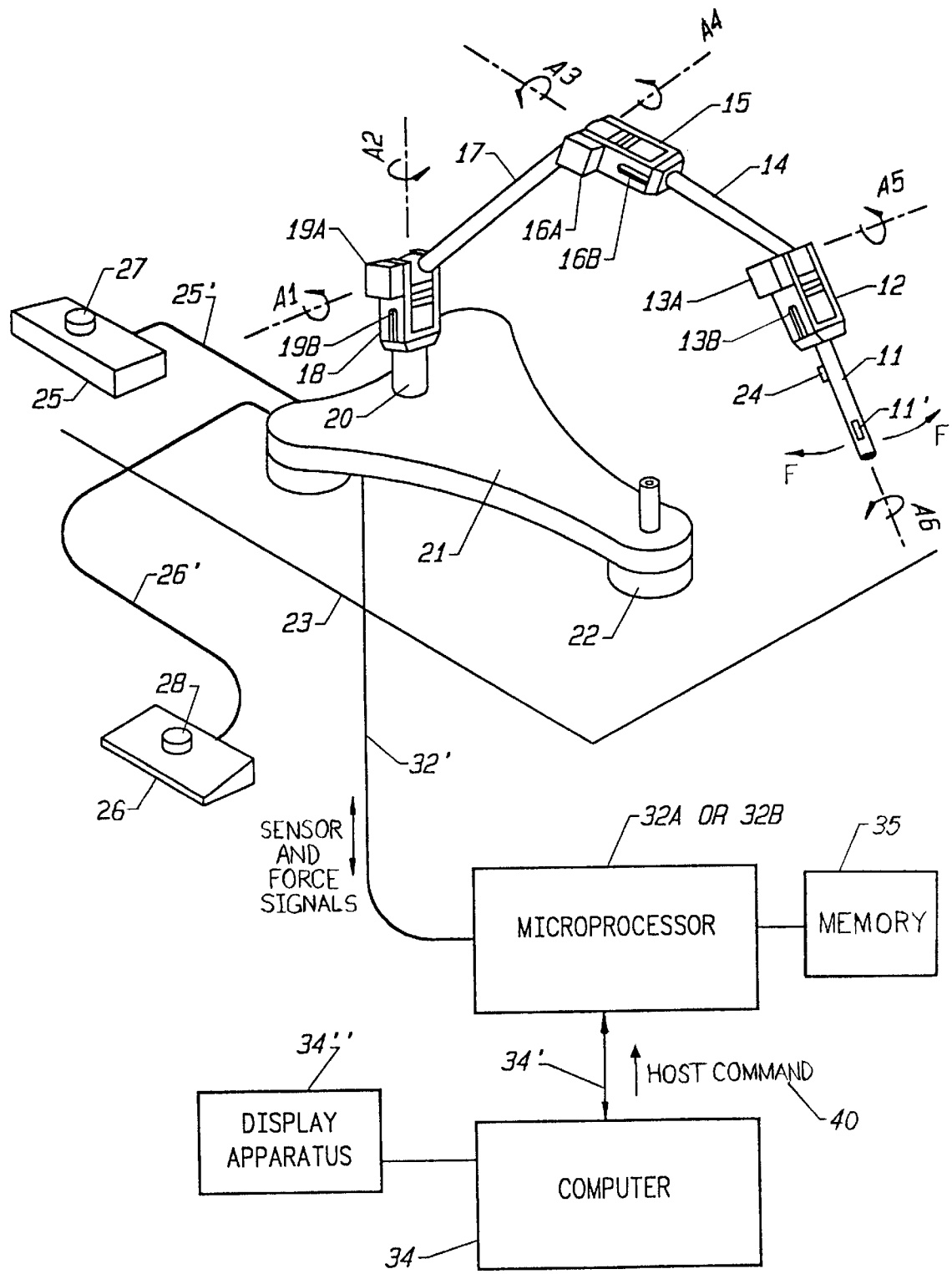
FIG. 1 is a perspective view of an embodiment of the present invention.

Referring to FIG. 1, a stylus 11 is shown attached to a support apparatus which is, in turn, supported on a fixed surface. By electrical and electronic configurations described below, the stylus 11 is adapted to provide data from which a computer or other computing means such as a microprocessor can ascertain the position and orientation of the stylus as it moves in three-dimensional space. This information is then translated to an image on a computer display apparatus. The stylus 11 may be used, for example, by an operator to change the position of a cursor on a computer controlled display screen by changing the position and/or orientation of the stylus, the computer being programmed to change the position of the cursor in proportion to the change in position and/or orientation of the stylus. In other words, the stylus 11 is moved through space by the user to designate to the computer how or where to move the cursor on a computer display apparatus.

Also contemplated in the present invention is computer software and hardware which will provide feedback information from the computer to the stylus and cause forces on the stylus. This implementation is described in greater detail subsequently.

The stylus 11 is a pen-like stick which can be manipulated between the fingers, allowing for much better control and fine dexterity as compared to full hand grips or palm-supported styluses used by some prior art inventions. While the stylus 11 is described in terms of manual manipulation, other stylus configurations are envisioned by the present invention. In particular, this invention includes manipulation by those unable to manually manipulate a pen. A stylus of the present invention, need not be linear, but may be curved or angled so that it may be held, for example, by the foot or the mouth of a person.

Because the stylus is supported by a support apparatus which is in turn supported by a fixed surface or other stabilizing configuration, the user can manipulate the stylus with a minimum of effort. Also, if the user chooses to discontinue using the stylus, it is capable of maintaining its position in space, unattended. While FIG. 1 shows that preferred embodiment of the present invention, FIGS. 5–8 show alternative embodiments, such which are also contemplated under the present invention. It is preferable that the stylus have enough degrees of freedom to enable it to move through the mechanical linkage to give the user the amount of flexibility needed to move the cursor as desired. In FIG. 1, six degrees of freedom are shown and are labeled as Axis A1, A2, A3, A4, A5, and A6. This, of course, provides maximum flexibility. Fewer degrees of freedom, such as a plurality of degrees of freedom, may also be sufficient depending on the application.

In one embodiment, the stylus is connected to rigid individual components which are joined together by joints. While not shown, other types of support apparatus' are included in the present invention. For example, other configurations include a semi-flexible rod or any other moveable while supportive configuration which can support the stylus in the manner described herein.

In FIG. 1, a mechanical linkage pursuant to the present invention is depicted. The stylus 11 is coupled to supportable mechanical linkages via joint 12 which, in the shown embodiment, houses sensors 13A and 13B. Linkage 14, is connected, via joint 15 having position sensors 16A and 16B, to linkage 17. Joint 18 in turn connects linkage 17 with the vertical base protrusion 20 which emanates from the base 21. The sensors are used to produce a stylus locative signal which is responsive to and corresponds with the position of the stylus at any point in time during its normal operation. The stylus locative signal is used to provide information for use by a computer display apparatus of a computer. The term "joint" as used herein is intended to mean the connection mechanism between individual linkage components. In fact, two separate moveable members can be joined; such together forming a joint.

The base 21, if necessarily, can be immobilized by securing it onto the fixed surface 23 by way of bolt, screw or other attachment mechanism 22. Moreover, the present invention implements mechanical leverage and rubbing friction (not shown) between the supportable mechanical linkages 14 and 17 and the joints 12, 15 and 18 in order to provide resistance and support so as to allow better dexterity than can be achieved with free-floating stylus trackers. This support and leverage aids in reducing the fatigue associated with manipulating the free-floating stylus 11.

As mentioned above, attached to each joint 12, 15 and 18 are sensors 13A, 13B, 16A, 16B, 19A, and 19B, respectively. These sensors sense the angle differential before and after motion of the two segments connected by that joint. The sensors can be, for example, optical incremental encoders, optical absolute encoders and potentiometers. Because the three-dimensional position and/or orientation tracking is achieved mechanically, this preferred embodiment avoids problems that magnetic and ultrasonic sensors, such as those shown in the prior art, encounter with metal and shadowing. However, as shown in FIG. 1, if desired, sensing means can be used to track the position and/or orientation of the stylus by mounting a single or several orientation sensors in the stylus 11 itself, such referred to as a stylus mounted sensor 11'. An ultrasound, magnetic, optical or position and orientation sensor can be used as the stylus mounted sensor 11'.

FIG. 1 also shows a clicker button 24 on stylus 11. The button is connected to a switch which when in the on state, sends a signal to the computer giving it a command. In order to provide for accuracy when sending commands, this invention also includes a remote clicker unit. Therefore, since the clicking motion occurs at a distant location from the cursor control, there is little or no opportunity to accidently move the cursor while making a command. FIG. 1 shows two configurations for implementing this aspect of the present invention. The first is identified as an alternate hand-clicker 25, the second as foot pedal 26.

Digital buttons 27 and 28 which are connected to switches (not shown) on the remote attached peripherals such as a hand-held clicker unit 25 or a foot pedal 26, respectively, can generate additional digital input such transmitted through lines 25' and 26' respectively. Either of the shown ancillary remote command units, such including the hand unit 25 and the foot pedal 26 configurations, are favorable methods of inputting digital commands by command hardware or software (not shown) because pressing the button 27 or 28 does not compromise a user's ability to hold the stylus steady whereas pressing any button 24 on the stylus does compromise stylus stability.

Figure 2A:
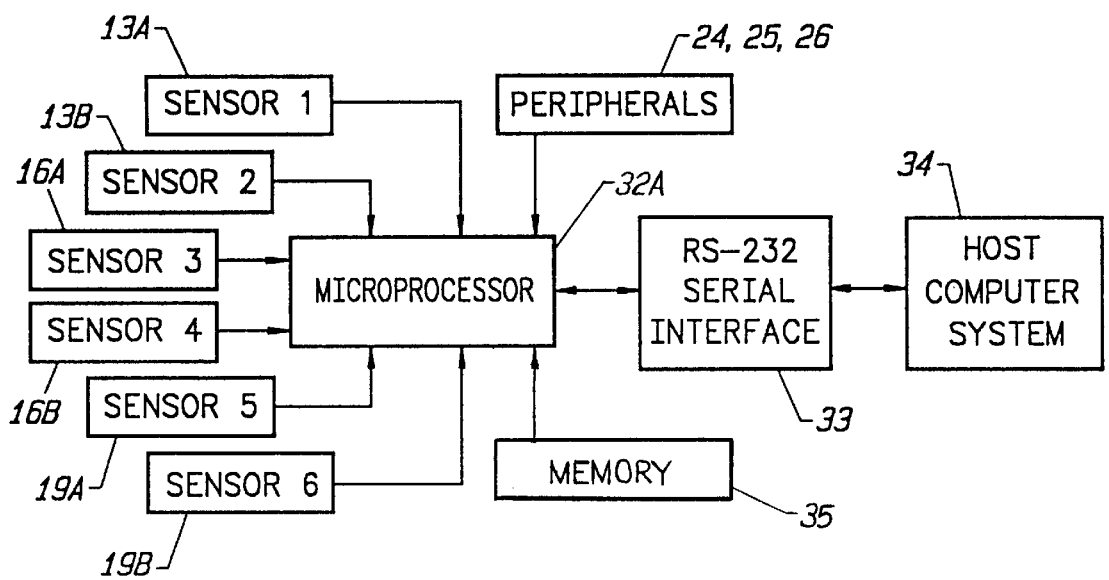
FIGS. 2A and 2B are block diagrams over-viewing two different electronic hardware configurations of the present invention.
Figure 2B:
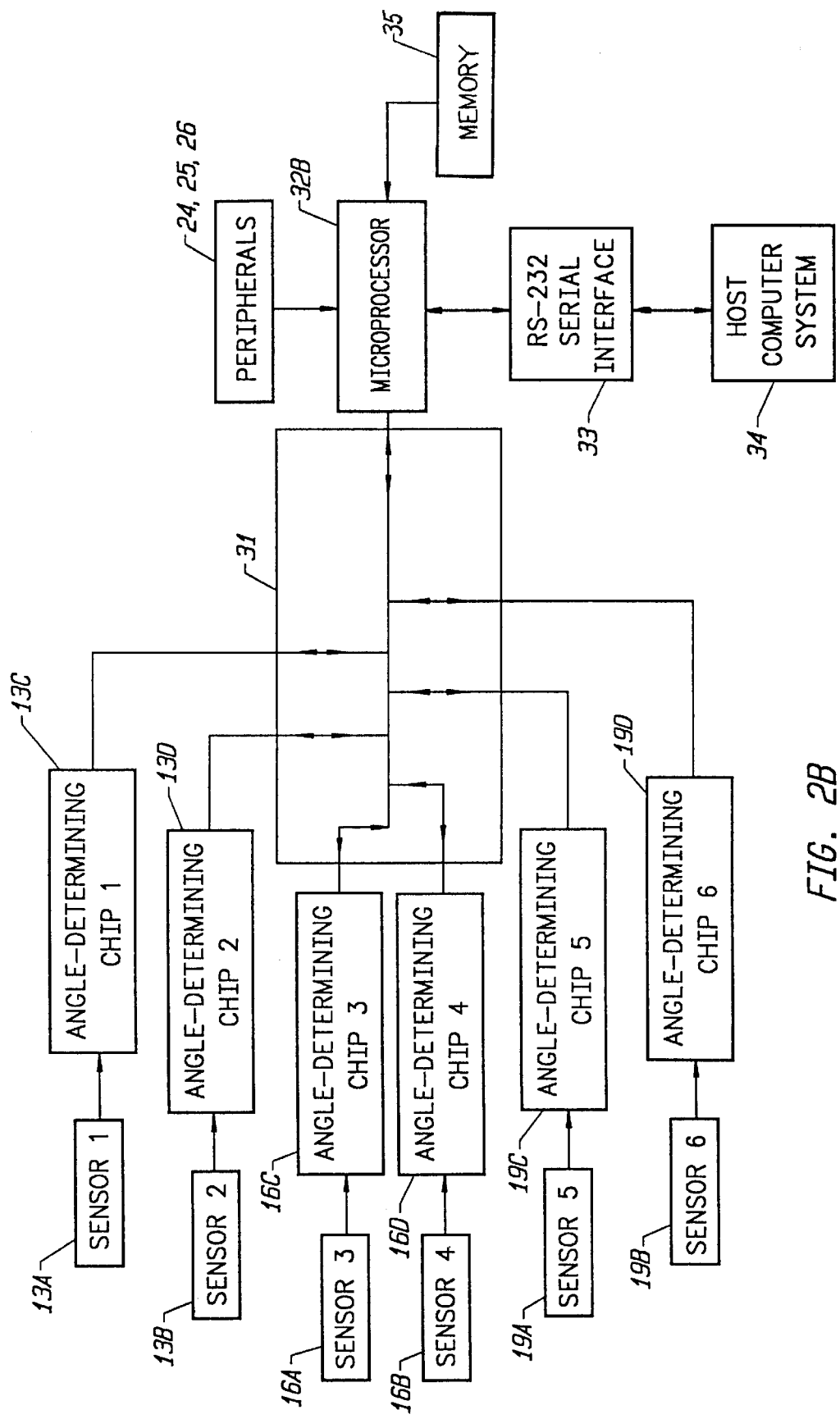

Referring to FIG. 2A, the sensors 13A, 13B, 16A, 16B, 19A and 19B, along with any peripherals 24, 25 or 26, can send their digital signals directly to a versatile floating-point processor or microprocessor 32A which is controlled by software stored in a digital ROM (Read-Only Memory) 35 via transmission line 32' or another form of transmission, i.e., radio signals. As shown in FIG. 2B, an alternative embodiment can be used to lessen the demands on the floating-point processor or microprocessor 32B. The digital inputs of the sensors 13A, 13B, 16A, 16B, 19A and 19B can be sent indirectly to the floating-point processor or microprocessor 32B by way of dedicated chips 13C, 13D, 16C, 16D, 19C and 19D, which pre-process the angle sensors' signals before sending them via bus 31 to the floating-point processor or microprocessor 32B which would combine these signals with those from the peripherals 24, 25 or 26. An 8-bit data bus plus chip-enable lines allow any of the angle determining chips to communicate with the microprocessor. Moreover, reporting the status of peripherals 24, 25 or 26 includes reading the appropriate digital switch and placing its status in the output sequence array. Some examples of specific electronic hardware usable for sensor pre-processing include quadrature counters, which are common dedicated chips that continually read the output of an optical incremental encoder and determine an angle from it, Gray decoders, filters, and ROM look-up tables.

The single-chip configuration of FIG. 2A is most applicable where the angle sensors 13A, 13B, 16A, 16B, 19A and 19B are absolute sensors, which have output signals directly indicating the angles without any further processing, thereby requiring less computation for the microprocessor 32A and thus little if any pre-processing. The multi-chip configuration of FIG. 2B is most applicable if the sensors 13A, 13B, 16A, 16B, 19A and 19B are relative sensors, which indicate only the change in an angle and which require further processing for complete determination of the angle.

In either configuration, if the microprocessor 32A or 32B is fast enough, it will compute stylus 11 position and/or orientation (or motion, if desired) on board the embodiment and send this final data through any standard communications interface such as an RS-232 serial interface 33 on to the host computer system 34 and to computer display apparatus 34" through transmission line 34' or another form of transmission. If the microprocessor 32A or 32B is not fast enough, then the angles will be sent to the host computer 34 which will perform these calculations on its own.

In addition to the single-chip and multi-chip configurations, a variation may consist of a single microprocessor which reads the peripherals, obtains the angles, possibly computes coordinates and orientation of the stylus 11, and supervises communication with the host computer 34. Another variation may consist of dedicated sub-circuits and specialized or off-the-shelf chips which reads the peripherals, monitors the angle sensors 13A, 13B, 16A, 16B, 19A and 19B, determine the joint angles, and handle communications with the host computer 34, all without software or a microprocessor 32A or 32B.

Software is only included in the two microprocessor-based configurations shown in FIGS. 2A and 2B. The more dedicated hardware a given configuration includes, the less software it requires. The software consists of a main loop (FIG. 3) and an output interrupt (FIGS. 4A and 4B).

Figure 3:
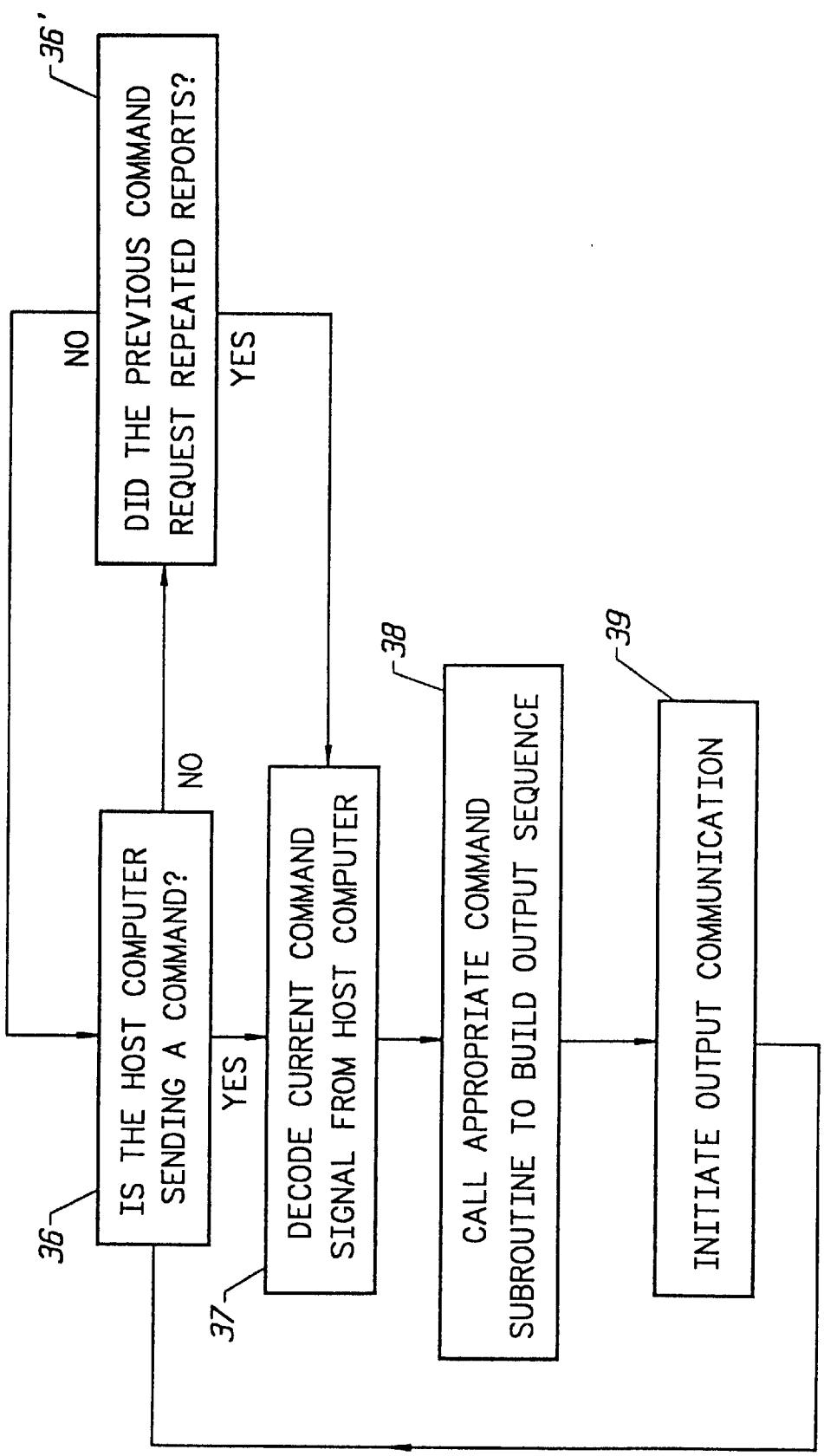
FIG. 3 is a flow chart describing the main software command loop for two different electronic hardware configurations shown in FIG. 2.

Referring to FIG. 3, the main command loop responds to the host computer 34 and runs repeatedly in an endless cycle. With each cycle, incoming commands 40 from the host computer are monitored 36 and decoded 37, and the corresponding command subroutines for reporting angles, thus stylus position and/or orientation (see FIGS. 4A and 4B), are then executed 38. Two possible subroutines are shown in FIGS. 4A (single-chip method) and 4B (multi-chip method). When a subroutine terminates, the main command loop resumes 39. Available command will include but are not limited to: reporting the value of any single angle, reporting the angles of all six angles at one time, reporting the values of all six angles repeatedly until a command is given to cease aforementioned repeated reporting, reporting the status of peripheral buttons, and setting communications parameters. If the angle sensors require preprocessing, these commands will also include resetting the angle value of any single angle or otherwise modifying preprocessing parameters in other applicable ways. Resetting pre-processed angle values or preprocessing parameters does not require output data from the device. The microprocessor 32A or 32B simply sends appropriate control signals to the preprocessing hardware 13C, 13D, 16C, 16D, 19C, and 19D. If the microprocessor or floating-point processor is fast enough to computer stylus coordinates and orientation, these commands will also include reporting the stylus coordinates once, reporting the stylus coordinates repeatedly until a command is given to cease, ceasing aforementioned repeated reporting, reporting the stylus coordinates and orientation once, reporting the stylus coordinates and orientation repeatedly until a command is given to cease, and ceasing aforementioned repeated reporting. If force reflection is supported, these commands will also include reporting the forces felt by any single joint, setting the resistance of any single joint, and locking or unlocking a joint.

Figure 4B:
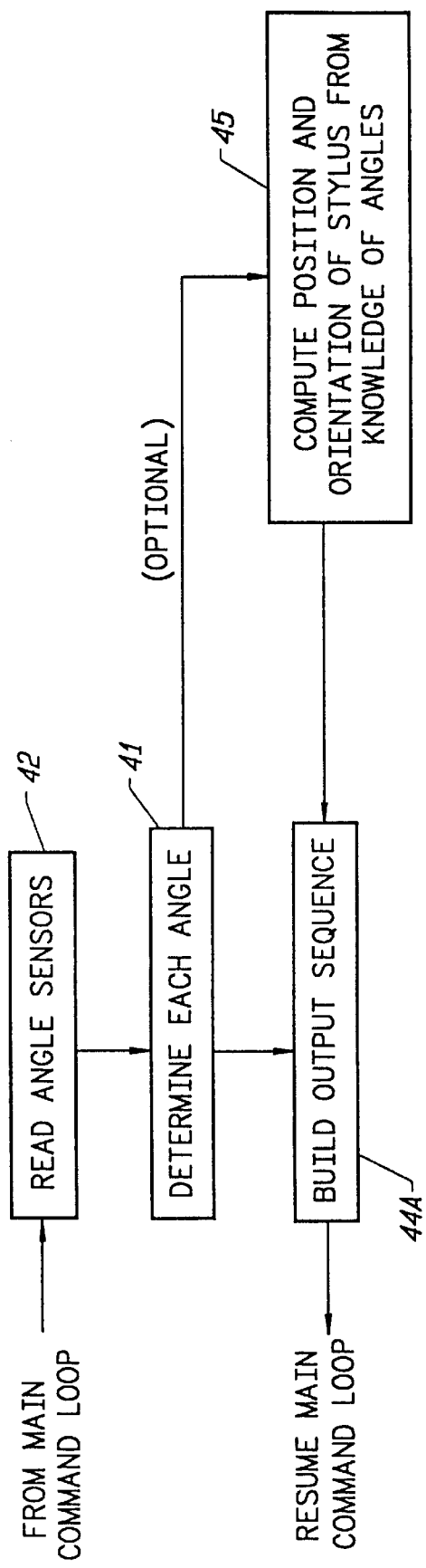
FIGS. 4A and 4B are flow charts describing two different interrupt service routines for serial output to host computer.
Figure 4A:
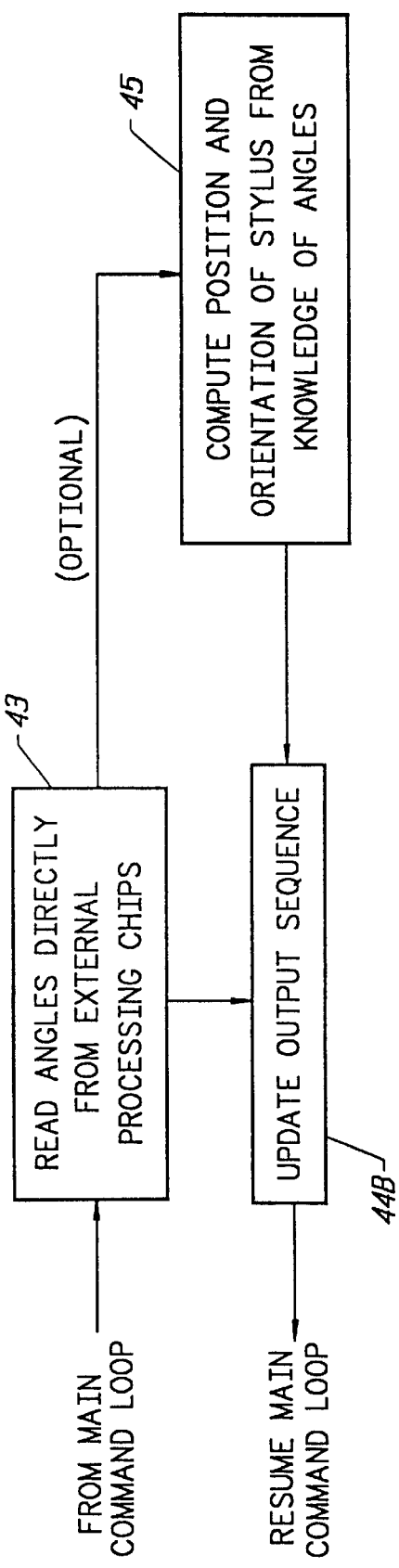

Any report by the subroutines of FIGS. 4A and 4B of a single angle value requires determining 41 the given joint angle. For the single-chip configuration shown in FIG. 2A, this subroutine directly reads the appropriate angle sensor 42 from among sensors 13A, 13B, 16A, 16B, 19A, and 19B. For the multi-chip configuration shown in FIG. 2B, this subroutine reads the outputs 43 of pre-processing hardware 13C, 13D, 16C, 16D, 19C, and 19D which have already determined the joint angles from the outputs of the sensors 13A, 13B, 16A, 16B, 19A, and 19B. Any report of multiple angles is accomplished by repeatedly executing the subroutine for reporting a single angle. The subroutine Is executed once per angle, and the values of all angles are then included in the output sequence array. If the optional parts of the subroutines 45 are included, then these subroutines become the coordinate reporting subroutines. Many other command subroutines exist and are simpler yet in their high-level structure.

After determining the given joint angle, the microprocessor 32A or 32B creates an output sequence 44A or 44B by assembling an array in a designated area of processor memory 35 which will be output by the microprocessor's communications system at a given regular communications rate. The sequence will contain enough information for the host computer 34 to deduce which command is being responded to, as well as the actual angle value that was requested. Returning to FIG. 3, a query 36 in the main command loop asks whether the previous command requested repeated reports. If so, the main command loop is initiated accordingly. The communications output process (not shown) may be as simple as storing the output data in a designated output buffer, or it may involve a standard set of communications Interrupts that are an additional part of the software. Setting communications parameters does not require output data from the device. The microprocessor 32A or 32B simply resets some of its own internal registers or sends control signals to its communications sub-unit.

To report the stylus' 11 coordinates, three of the five or six angle values are pre-read and knowledge of link lengths and device kinematics are incorporated to compute stylus 11 coordinates. These coordinates are then assembled in the output sequence array.

To report the stylus' 11 orientation, at least five angle values are read and knowledge of link lengths and device kinematics are incorporated to compute stylus 11 orientation. The orientation consists of three angles (not necessarily identical to any joint angles) which are included in the output sequence array.

Forces felt by a joint, are reported setting a joint's resistance, and locking or unlocking a joint are accomplished by using interaction of the microprocessor 32A or 32B with force-reflecting hardware. Reporting forces felt by a joint uses a force sensor mounted on the joint and then places the resulting value in the output sequence array. To set a joint's resistance and lock or unlock a joint control, signals are used to control force-reflection hardware and do not require any output data from the device.

Also contemplated in the present invention is computer software and hardware which will provide feedback information from the computer to the stylus, such as host commands 40 (shown in FIG. 1). This type of implementation is known in robotics and thus is easily incorporated into a system including the present invention. When a surface is generated on the computer screen, the computer will send feedback signals to the mechanical linkage which has force generators identified by numerals 13A, 13B, 16A, 16B, 19A, and 19B (which also identifies the sensors, see above) for generating force F (see FIG. 1) in response to the cursor position on the surface depicted on the computer screen. Force is applied for example, by added tension in the joints which is in proportion to the force being applied by the user and in conjunction with the image on the screen.

Figure 8:
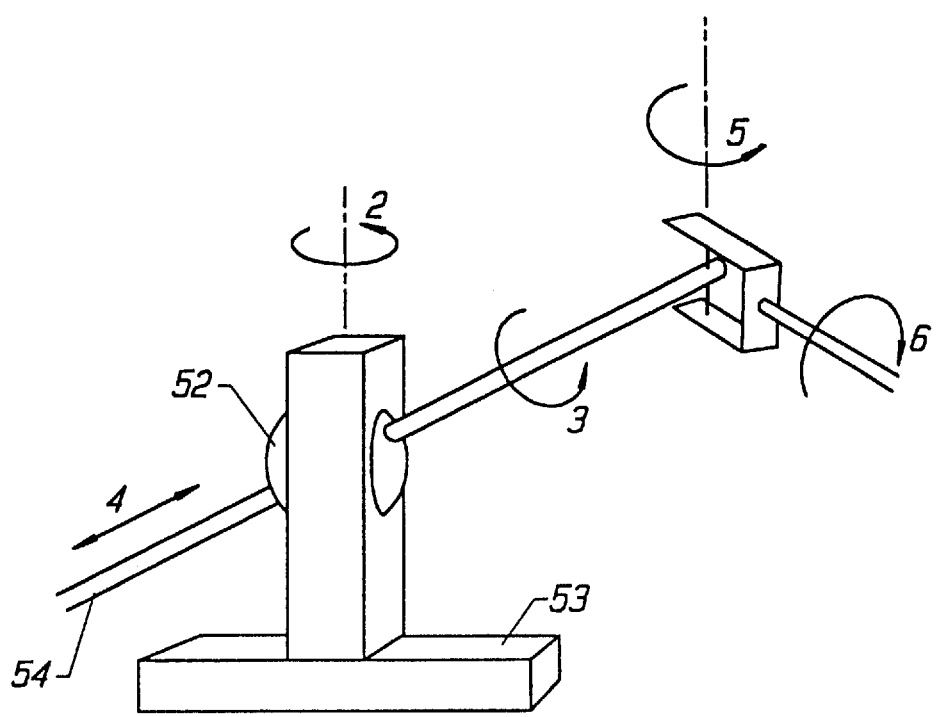
FIG. 8 is a perspective view of another embodiment.

The various configurations of the mechanical linkages shown in FIG. 5, FIG. 6, FIG. 7 and FIG. 8 which have different numbers of individual components and joints than shown in FIG. 1 are illustrative of the numerous possible configurations which can provide varying degrees of freedom inherent in the present invention. Referring to FIG. 5, FIG. 6 and FIG. 8, note that a rounded object such as a ball can act as a joint having motion in three degrees of freedom. In conjunction with other mechanical linkages and attachments, this permits sufficient degrees of freedom for the purposes of the present invention. In each figure, the orientation of the degrees of freedom of each joint is depicted by curved lines, numbered consecutively.

Briefly, FIG. 5 shows an embodiment having 6 rotary joints including a rounded joint 46 at the base such that three degrees of motion are available at that joint. FIG. 6 shows an embodiment having 5 rotary joints and one linear joint, including a three-dimensionally rotatable rounded joint 47 at the base through which one mechanical linkage can slide linearly and where the base is attached to a fixed surface 48 such that the surface does not prohibitively impede the movement of the device. FIG. 7 shows an embodiment have 3 rotary and 3 linear joints where the basal connection can slide about the base in a two-dimensional plane in the cross configuration 49 on base 51. FIG. 8 shows an embodiment having 5 rotary joints and one linear joint, including a three-dimensionally rotatable rounded joint 52 at a perpendicular projection from the base 53 through which one mechanical linkage 54 can slide linearly through the joint 52.

Figure 9:
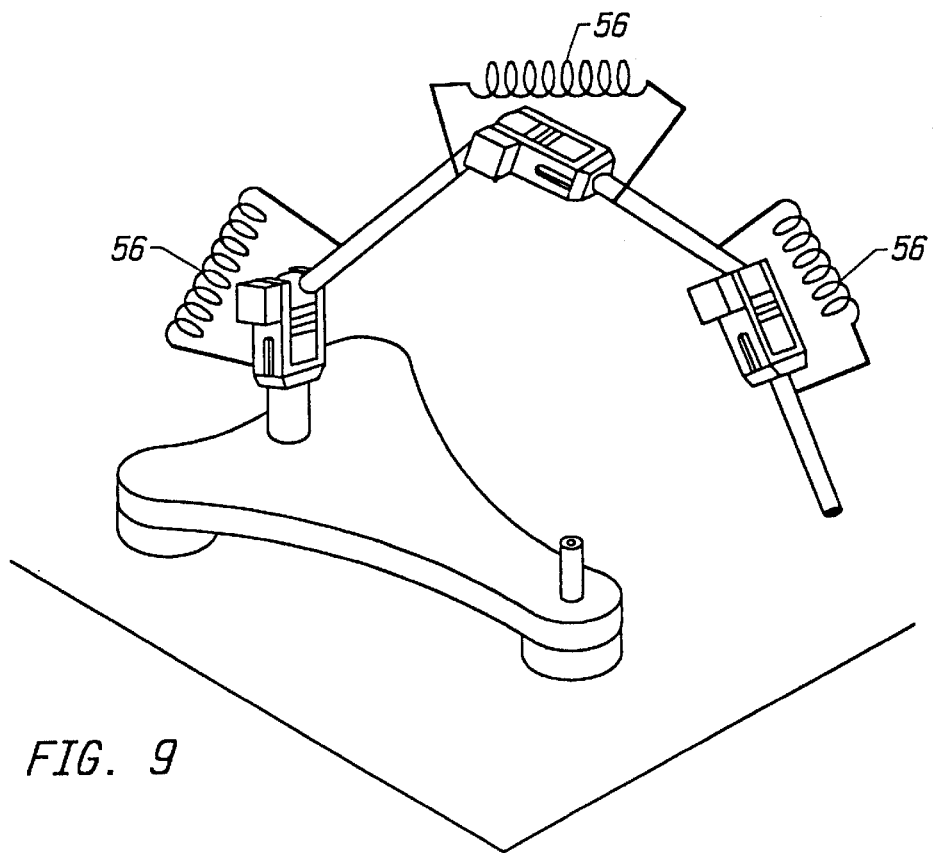
FIG. 9 shows an embodiment of the resistance mechanism of the present invention.
Figure 10:
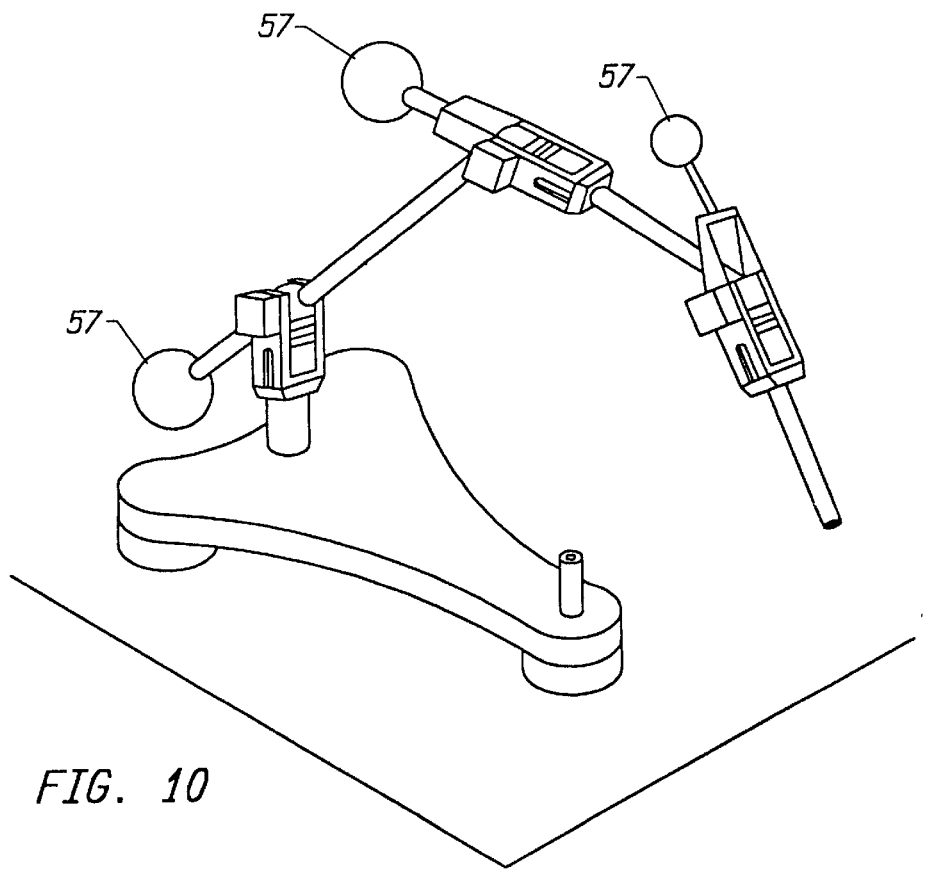
FIG. 10 shows another embodiment of the resistance mechanism.
Figure 11:
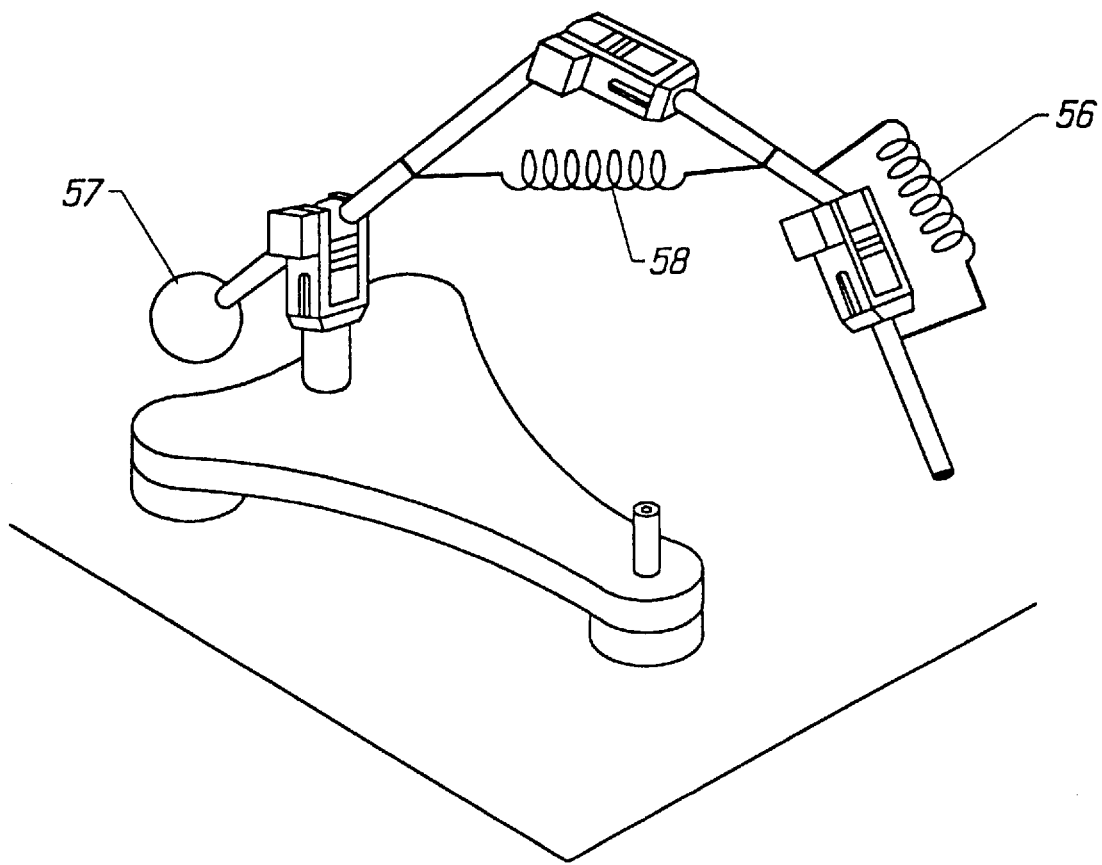
FIG. 11 shows yet another embodiment of the resistance mechanism.

While any of the above discussed configurations or others can be used in accordance with the present invention, FIGS. 9-11 show different mechanisms for providing resistance to the manual manipulation of the stylus by the user. FIG. 9, for example, shows return or tension springs 56 on each joint of the embodiment shown in FIG. 1. In an alternative embodiment, FIG. 10, shows counter-weights 57 on each joint. Moreover, FIG. 11, shows a combination of a return or tension spring 56, a counter-weight 57 and a compression spring 58. The arrangement of the resistance mechanism used should depend upon the configuration stylus mechanical linkage combination, such arrangement preferably chosen to maximize the ease with which the user can manipulate the stylus 11 in free space in accordance with the present invention.

What is claimed:

1. An interactive device for use in conjunction with a host computer, wherein images are displayed on a computer display apparatus coupled to said host computer, said interactive device comprising:

a user manipulatable object engaged by a user's hand to allow dexterous manipulations by fingers of said user;

a mechanical linkage coupled to a fixed surface by a base rotary joint and coupled to said user manipulatable object by an object rotary joint, said linkage for supporting said object allowing at least five degrees of freedom in motion of said object with respect to said fixed surface, wherein said mechanical linkage provides said degrees of freedom through a structure of substantially rigid members joined by a plurality of rotary joints, said mechanical linkage providing said user the ability to manipulate both the location and orientation of said object in three dimensional space, and wherein a configuration of said degrees of freedom allow said user to rotate said object about a fixed point in space when three degrees of freedom closest to said fixed surface are held fixed and when remaining ones of said degrees of freedom are moved;

one or more sensors for producing an interactive object locative signal which is responsive to and corresponding with the position of the user manipulatable object, said object locative signal providing information about the location of said user manipulatable object for use by said host computer to manipulate images displayed by said computer display apparatus in accordance with said location of said user manipulatable object, said images including a cursor whose position on said computer display apparatus is influenced by said user manipulatable object locative signal; and a force generator for generating a force on said user object in at least one of said five degrees of freedom in response to force signals provided to said interactive device, said force signals correlated to information displayed on said computer display apparatus including interaction of said cursor with other images on said computer display apparatus.

2. An interactive device as recited in claim 1 wherein said mechanical linkage further includes a counter weight for opposing a gravitational weight of said user manipulatable object.

3. An interactive device as recited in claim 1 wherein said mechanical linkage further includes a spring for opposing a gravitational weight of said user manipulatable object.

4. An interactive device as recited in claim 1 wherein said linkage allows six degrees of freedom in motion of said object, wherein three of said degrees of freedom closest to said user manipulatable object allow an orientation of said object to be adjusted in three dimensional space while three degrees of freedom closest to said fixed surface allow a location of said object to be adjusted in three dimensional space.

5. An interactive device as recited in claim 1 further including a switch coupled to said user manipulatable object, said switch capable of being in multiple states in response to user interaction, wherein a state of said switch being transmitted to said host computer and wherein an action is taken by said host computer in response to said state of said switch.

6. An interactive device as recited in claim 1 further including a foot pedal containing a switch capable of being in multiple states in response to user interaction, a state of said switch being transmitted to said host computer, wherein an action is taken by said host computer in response to said switch state.

7. An interactive device as recited in claim 1 wherein a configuration of said joints allows said user manipulatable object to spin freely about an axis extending through the length of said object while all others of said joints remain fixed in position.

8. An interactive device as recited in claim 1 wherein said object is a stylus having a pen-like configuration to allow writing-like manipulations between said fingers.

9. A cursor control interface for use in conjunction with a host computer, said interface enabling a user to control the position of a cursor displayed by said host computer, said interface also enabling said host computer to convey force feedback to a user in accordance with cursor position, said interface comprising:

a user manipulatable object engaged by a user's hand to allow dexterous manipulations of said user manipulatable object;

a mechanical linkage coupled to a fixed surface by a rotary joint and coupled to said user manipulatable object, said linkage for supporting said object while allowing at least five degrees of freedom in the motion of said object with respect to said fixed surface, said mechanical linkage providing said degrees of freedom through a structure of substantially rigid members joined by rotary joints, said mechanical linkage providing said user the ability to manipulatable both a location and orientation of said object in three dimensional space;

a force generator for generating a force on said user object in at least one of said five degrees of freedom in response to signals provided by said host computer, said force signals correlated to information displayed on said computer display apparatus;

a device microprocessor separate from said host computer, said device microprocessor enabling communication between said cursor control interface and said host computer;

one or more sensors coupled to said device microprocessor for producing an interactive object locative signal which is responsive to and corresponding with the position of said user manipulatable object in three dimensional space, said object locative signal for use by said host computer to manipulate images displayed by said computer display apparatus in accordance with said location of said user manipulatable object, said displayed images including a cursor whose position on said computer display apparatus is influenced by said object locative signal;

memory local to said device microprocessor and separate from memory of said host computer for locally storing a representation of said locative signal; and a communication bus connecting said device microprocessor and said host computer, said bus used in conveying force feedback commands from said host computer to said local microprocessor, said bus also used in conveying a representation of said object locative signal from said cursor control interface to said host computer.

10. A cursor control interface as recited in claim 9 wherein an order and configuration of said joints and said members allow said user to rotate said object about a fixed point in space when three degrees of freedom closest to said fixed surface are held fixed and when remaining ones of said degrees of freedom are moved.

11. A cursor control interface as recited in claim 9 wherein said device microprocessor computes said position and orientation of said user manipulatable object using data from said sensors and knowledge of link lengths and device kinematics.

12. A cursor control interface as recited in claim 9 wherein said device microprocessor monitors and decodes host commands including said force feedback commands from said host computer.

13. A cursor control interface as recited in claim 12 wherein said device microprocessor reads said one or more sensors in response to said decoded commands.

14. A cursor control interface as recited in claim 12 wherein said device microprocessor controls said force generators in response to said decoded commands.

15. A cursor control interface as recited in claim 9 wherein said memory includes non-volatile memory.

16. A cursor control interface as recited in claim 9 wherein said non-volatile memory stores program instructions for setting communication parameters for enabling communication between said microprocessor and said host computer and for decoding at least one of said host commands.

17. A cursor control interface as recited in claim 9 wherein said non-volatile memory includes a look-up table.

18. A cursor control interface as recited in claim 9 further including a switch physically coupled to said user manipulatable object and electrically coupled to said local microprocessor, said switch capable of being in one of multiple states in response to user interaction, and wherein the state of said switch is transmitted to said host computer by said local microprocessor.

19. A cursor control interface as recited in claim 9 wherein said communication bus is a serial interface.

20. A cursor control interface as recited in claim 12 further including a plurality of command routines stored in said local memory, at least one of said command routines allowing said microprocessor to control said force generator in accordance with at least one of said decoded host commands, and at least one of said command routines reporting a representation of said locative signal to said host computer in accordance with at least one of said decoded host commands.

21. A cursor control interface as recited in claim 20 further including a switch on said user objects wherein said local microprocessor can monitor and report the state of said switch, and wherein the state of said switch to said host is controlled by one of said command routines.

22. A cursor control interface as recited in claim 20, further including a foot pedal wherein said local microprocessor can monitor and report the state of said foot pedal and report said state to said host computer.

23. A cursor control interface for use in conjunction with a host computer, said interface enabling a user to control the position of a cursor displayed by said host computer, said interface also enabling said host computer to convey force feedback to a user in accordance with cursor position, said interface comprising:

a user manipulatable object engaged by a user's hand to allow dexterous manipulations of said user manipulatable object;

a mechanical linkage coupled to a fixed surface by a rotary joint and coupled to said user manipulatable object, said linkage for supporting said object while allowing at least five degrees of freedom in the motion of said object with respect to said fixed surface, said mechanical linkage providing said degrees of freedom trough a structure of substantially rigid members joined by rotary joints, said mechanical linkage providing said user the ability to manipulatable both a location and orientation of said object in three dimensional space;

a force generator for generating a force on said user object in at least one of said five degrees of freedom in response to signals provided by said host computer, said force signals correlated to information displayed on said computer display apparatus;

a device microprocessor separate from said host computer, said device microprocessor enabling communication between said cursor control interface and said host computer;

one or more sensors coupled to said device microprocessor for producing an interactive object locative signal which is responsive to and corresponding with the position of said user manipulatable object in tree dimensional space, said object locative signal for use by said host computer to manipulate images displayed by said computer display apparatus in accordance with said location of said user manipulatable object, said displayed images including a cursor whose position on said computer display apparatus is influenced by said object locative signal;

memory local to said device microprocessor and separate from memory of said host computer for locally storing a representation of said locative signal; and a communication bus connecting said device microprocessor and said host computer, said bus used in conveying force feedback data from said host computer to said local microprocessor, said bus also used in conveying a representation of said object locative signal from said cursor control interface to said host computer.

24. A cursor control interface as recited in claim 23 wherein an order and configuration of said joints and said members allow said user to rotate said object about a fixed point in space when three degrees of freedom closest to said fixed surface are held fixed and when remaining ones of said degrees of freedom are moved.

25. A cursor control interface as recited in claim 23 wherein said device microprocessor computes said position and orientation of said user manipulatable object using data from said sensors and knowledge of link lengths and device kinematics.

26. A cursor control interface as recited in claim 23 wherein said memory includes non-volatile memory.

27. A cursor control interface as recited in claim 23 wherein said non-volatile memory stores program instructions for setting communication parameters for enabling communication between said microprocessor and said host computer.

28. A cursor control interface as recited in claim 23 further including a switch physically coupled to said user manipulatable object and electrically coupled to said local microprocessor, said switch capable of being in one of multiple states in response to user interaction, wherein the state of said switch is transmitted to said host computer by said local microprocessor.

29. A cursor control interface as recited in claim 28 wherein said state of said switch provides a command to said host computer.

30. A cursor control interface as recited in claim 23 wherein said mechanical linkage includes at least one counterweight to ease manipulation of said user manipulatable object by said user.

* * * * *